United States Patent [19]

Mori et al.

[11] Patent Number: 4,875,749
[45] Date of Patent: Oct. 24, 1989

[54] MECHANISM FOR POSITIONING THE LIGHT-RECEIVING END OF AN OPTICAL CONDUCTOR CABLE AT THE FOCAL POSITION OF A LENS

[75] Inventors: Kei Mori, 3-16-3-501, Kaminoge, Setagaya-ku, Tokyo; Isao Kosugi, Tokyo, both of Japan

[73] Assignee: Kei Mori, Tokyo, Japan

[21] Appl. No.: 238,023

[22] Filed: Aug. 29, 1988

[30] Foreign Application Priority Data

Dec. 28, 1987 [JP] Japan .................. 62-334062

[51] Int. Cl.⁴ .................................. G02B 6/32
[52] U.S. Cl. .................. 350/96.18; 350/96.20
[58] Field of Search .................. 350/96.20, 96.18

[56] References Cited

U.S. PATENT DOCUMENTS

| | | | |
|---|---|---|---|
| 4,319,802 | 3/1982 | Bowes | 350/96.20 |
| 4,436,083 | 4/1984 | Mori | 126/417 |
| 4,589,727 | 5/1986 | Williams | 350/96.20 |
| 4,775,211 | 10/1988 | Wondrazek et al. | 350/96.20 |

FOREIGN PATENT DOCUMENTS 58-116501 7/1983 Japan.
59-9616 1/1984 Japan.
63-12274 1/1988 Japan.

*Primary Examiner*—James W. Davie
*Attorney, Agent, or Firm*—Jordan and Hamburg

[57] ABSTRACT

A mechanism for positioning the light receiving end of an optical conductor cable at the focal position of a lens comprises an optical conductor cable supporting member for supporting an optical conductor cable, and a fixing device for fixing the light-receiving end of the optical conductor cable to the cable supporting member. The fixing device comprises a cap nut provided with a slit through which the optical conductor cable is inserted in the direction of the optical axis, a male screw threaded on the cable supporting member and engaged with the cap nut, and a collar portion formed on the outer circumference of the optical conductor cable at the light-receiving end thereof.

12 Claims, 3 Drawing Sheets

MECHANISM FOR POSITIONING THE LIGHT-RECEIVING END OF AN OPTICAL CONDUCTOR CABLE AT THE FOCAL POSITION OF A LENS

BACKGROUND OF THE INVENTION

The present invention relates to a mechanism for positioning the light-receiving end of an optical conductor cable onto the focal position of a lens preferably employed in the case of focusing the sun's rays by use of a lens and guiding the same into an optical conductor cable.

The present applicant has previously proposed in various ways a sun ray collecting device in which the sun's rays are focused by a lens, guided into an optical conductor, and then transmitted through the optical conductor onto an optional desired place for use in illumination or for other like purposes. Furthermore, the present applicant has also proposed that the aforementioned sun ray collecting device be accommodated in a transparent capsule in order to protect the lens from wind, rain, dust etc.

The sun ray collecting device previously proposed by the present applicant has a cylindrical foundation, a dome-shaped head portion made of a transparent substance, and a capsule for use in the sun ray collecting device consisting of a foundation and a head portion. When the device is being employed, the sun ray collecting device is accommodated inside the capsule. The sun ray collecting device comprises, for instance, a large number of lenses, a large number of lens-holding apparatuses provided for the respective lenses, and a large number of optical fibers or an optical conductor cable having a light-receiving end placed at the focal position of the lens.

The sun's rays focused by the lenses are guided into the optical conductor cable and transmitted through it onto an optional desired place.

SUMMARY OF THE INVENTION

It is an object of the present invention to provide a mechanism for positioning the the light-receiving end of an optical conductor cable onto the focal position of a lens preferably employed in the case of focusing the sun's rays by use of a lens and guiding the same into an optical conductor cable.

It is another object of the present invention to provide a mechanism for positioning the light-receiving end of an optical conductor cable on the focal position of the light ray components of a desired wave-length contained in the sun's ray.

The above-mentioned features and other advantages of the present invention will be apparent from the following detailed description which goes with the accompanying drawings.

DESCRIPTION OF THE PREFERRED EMBODIMENTS

Figure 1:
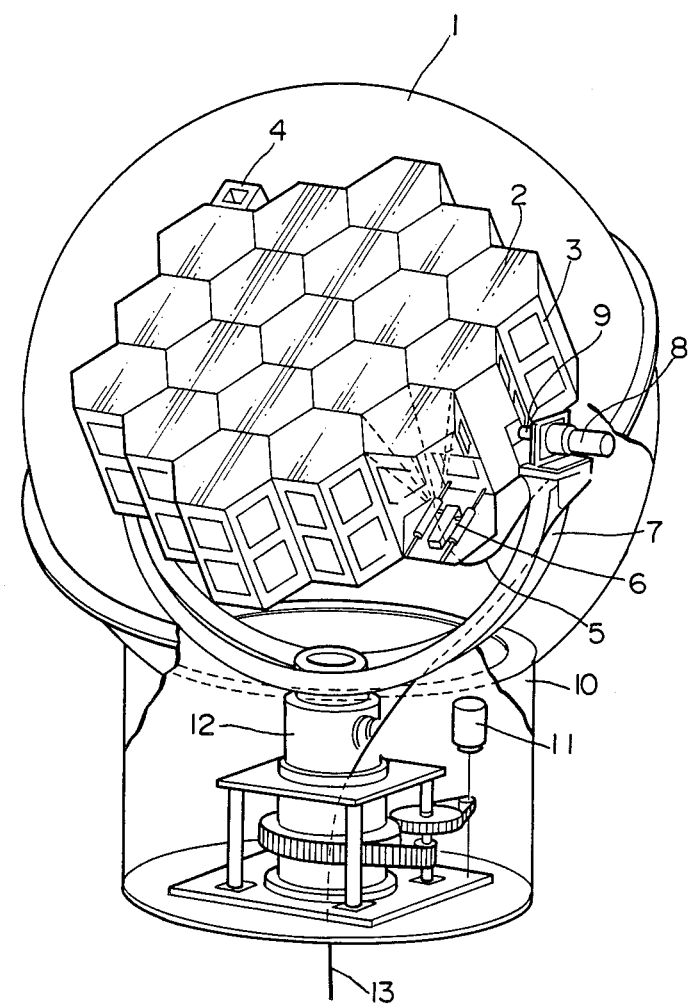
FIG. 1 is a perspective view for explaining the embodiment of a sun ray collecting device as applied to the present invention.

FIG. 1 is a detailed perspective view for explaining an embodiment of a sun ray collecting device related to the present invention. In FIG. 1, the reference numeral 1 designates a transparent protective capsule, 2 Fresnel lenses, 3 lens holders, 4 a sun ray direction sensor, 5 optical fibers (or optical conductor cables) each having a light-receiving end placed on the focal position of some Fresnel lenses, 6 fiber holders, 7 an arm, 8 a stepping motor, 9 a horizontal rotatable shaft rotated by the stepping motor 8, 10 a foundation for carrying a protective capsule 1, 11 another stepping motor, and 12 a vertical rotatable shaft rotated by the stepping motor 11, and 13 optical conductor cable.

As was already proposed by the present applicant, the above-mentioned sun ray collecting device detects the direction of the sun by use of the sun ray direction-sensor 4 and drives the stepping motors 8 and 11, the horizontal, rotatable shaft 9 and the vertical rotatable shaft 12 according to the detection signal generated by the direction sensor 4 so as to cause the direction sensor 4 to face the sun. In such a way, the sun's rays focused by the respective lenses 2, are guided into each optical fiber 5 through the light-receiving end thereof respectively put on the focal position of each lens. The respective optical fibers or optical conductor cables 5 for each lens are guided from the sun ray collecting device by each fiber or cable. The sun's rays focused by each lens are transmitted onto an optional desired place through optical conductor cable 13 and employed there.

Figure 2:
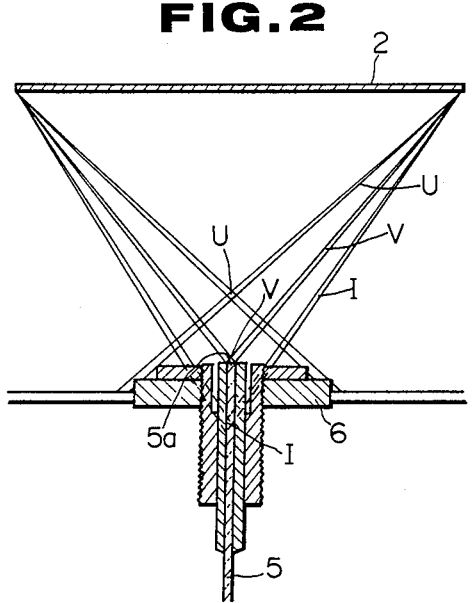
FIG. 2 is an explanatory view showing an example in the case of putting the light-receiving end-surface of the optical conductor cable on the focal position of the light ray components of a desired wave-length contained in the sun's rays.

FIG. 2 is an explanatory view for explaining the relationship between the Fresnel lens 2 and the optical fiber 5 both shown in FIG. 1. In FIG. 2, the symbol U represents the focus of the ultraviolet light contained in the sun's rays, V represents the focus of the visible light rays contained therein, and I represents the focus of the infrared rays contained therein. As shown in FIG. 2, when the light-receiving end 5a of the optical fiber 5 is put on the focal position V, only visible light rays containing neither ultraviolet nor infrared rays are guided into the optical fiber 5.

As mentioned above, it is important to position the light-receiving end of an optical conductor cable onto the focal position of a lens in a sun ray collecting device.

Figure 3:
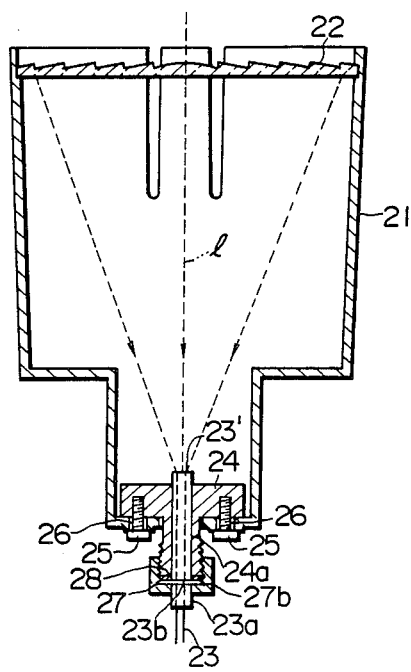
FIG. 3 is a cross-sectional construction view for explaining an embodiment according to the present invention.
Figure 4:
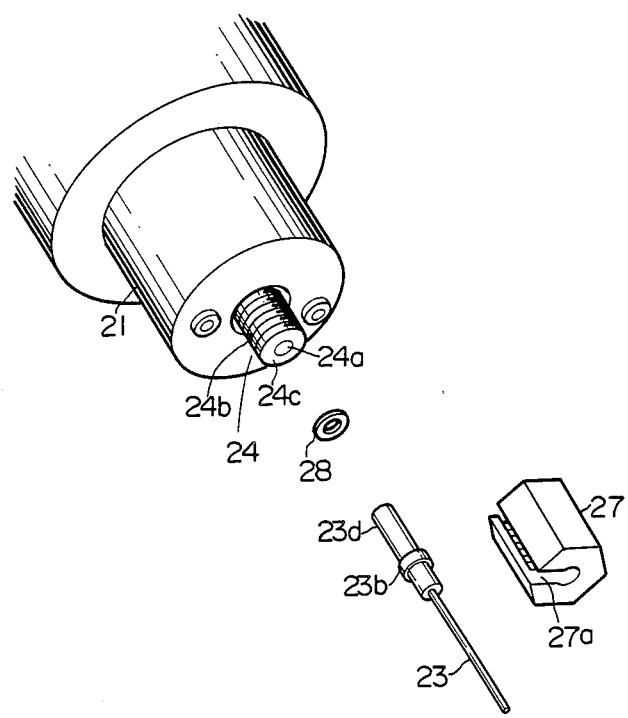
FIG. 4 is a perspective view showing disassembled parts thereof.

FIG. 3 is a cross-sectional view for explaining the main part of the embodiment according to the present invention. FIG. 4 is a perspective view showing disassembled parts thereof. In FIGS. 3 and 4, the reference numeral 21 designates a lens-fixing frame, 22 a lens mounted on the upper portion of the lens-fixing frame 21, 23 an optical conductor cable, 24 an optical conductor cable-holding member installed on the lower end portion of the lens-fixing frame 21, 25 a bolt for fixing the optical conductor cable holding member 24 to the lower end portion of the lens-fixing frame 21, and 26 a mounting hole bored on the lower end portion of the lens-fixing frame 21.

The hole 26 is formed in the form of a loose hole larger than the outer diameter of the bolt 25. After temporarily mounting the optical conductor cable holding member 24 onto the lower end portion of the lens-fixing frame 21, by use of bolts 25 in such a way as shown in FIG. 3, the position of the holding member 24 is adjusted forward-and-backward and right-and-left on the surface of the drawing (FIG. 3). After putting the light-receiving end 23' of the optical conductor cable 23 on the optical axis L of the lens 22, the optical conductor cable holding member 24 is fixed in that position by fastening the bolt 25. The optical conductor cable 23 has a protective outer cover 23a at the light-receiving end. The protective outer cover 23a is inserted into the hole 24a bored through the optical conductor cable-holding member 24 as shown in FIG. 3.

A threaded portion 24b is formed on the outer surface of the lower end portion of the optical conductor cable holding member 24, and a cap nut 27 is engaged with the threaded portion 24b as shown in FIG. 3 so as to fixedly hold the optical conductor cable 23 as shown in FIG. 3. Namely, a collar portion 23b is formed on the outer cover 23a of the optical conductor cable 23, and the lower end portion 24c of the optical conductor cable-holding member 24 and the inner bottom surface 27b of the cap nut 27, clippingly fix the collar portion 23b there-between.

In the embodiment shown in FIGS. 3 and 4, a spacer 28 is interposed between the lower end surface 24c of the optical conductor cable holding member 24 and the collar portion 23b. A spacer 28 is employed for the purpose of adjusting the position of the light-receiving end 23' of the optical conductor cable 23 in the direction of the optical axis of the lens 22. For instance, in the case of employing no spacer 28, a mentioned above, the light-receiving end 23' of the optical conductor cable 23 is put on the focal position of the red-color component contained in the sun's rays. On the other hand, in the case of employing one spacer 28, the light-receiving end 23' of the optical conductor cable 23 is put on the focal position of the green-color component contained in the sun's rays while in the case of employing another thicker spacer or two spacers respectively having the same thickness as that of the former spacer 28, the light-receiving end 23' of the optical conductor cable 23 is put on the focal position of the blue-color component contained in the sun's rays.

Moreover, if the mechanism is assembled in such a way that the size of the lens-holding frame 21, the mounting position of the lens 22, the size of the optical conductor cable holding member 24, and the position of the collar portion 23b are all precisely determined beforehand, the light-receiving end surface 23' of the optical conductor cable 23 can be automatically put on the focal position of the light ray components of a desired wave-length contained in the sun's rays.

According to the present invention, the light-receiving end 23' of the optical conductor cable 23 can be easily put on the focal position of the light ray components of a desired wave-length contained in the sun's rays in the way mentioned above. In the embodiment of the present invention, a slit 27a is formed on the cap nut 27 in the direction of the axis in order to facilitate further the above-mentioned fixing works. Furthermore, after inserting the outer cover portion 23a of the optical conductor cable 23 into the hole 24a of the optical conductor cable-holding member 24 in the way mentioned above, the optical conductor cable 23 is put in the center of the cap nut 27 via the slit 27a. Afterward, the cap nut 27 is engaged with the threaded portion 24b of the optical conductor cable-holding member 24. In such a construction, the optical conductor cable 23 can be fixed to the lens-holding frame 21 by fastening the cap nut 27. Furthermore, the light-receivig end-surface 23' of the optical conductor cable 23 can be automatically put on the focal position of the light ray components of a desired wave-length in the direction of the optical axis of the lens 22.

And further, if the cap nut 27 has no slit 27a as mentioned above, the cap nut 27 has to be inserted first from the end portion of the optical conductor cable 23 not shown in FIGS. 3 and 4. The sun ray collecting device as shown in FIG. 1 uses a large number of lenses. For instance, in recent years a device using approximately two hundred lenses has been developed. In such a device a sun ray collecting device requires a large number of optical conductor cables and handling of the device becomes very troublesome. Especially, in the case of distributing a large number of optical conductor cables by inserting the same into a single pipe, it might be very difficult to insert all of the optical conductor cables into a single pipe causing the wearing out of the cap nut. And further, in the case of doing tasks in order as one by one, the work may become gradually difficult when the work approaches the final stages. On the contrary, as shown in the embodiment of the present invention, the slit formed on the cap nut and the outer diameter of the optical conductor cable, is a little larger than the width of the slit or the inner diameter of the cap nut. In such a construction, it might be very easy to do the wiring of the optical conductor cables.

As is apparent from the foregoing description, according to the present invention, handling of the optical conductor cables becomes remarkably easier as in the case of wiring a large number of optical conductor cables. Furthermore, the position of the light-receiving end-surface of the optical conductor cable can be easily adjusted so as to put its end surface on the focal position of the light ray components of a desired wave-length contained in the sun's rays. These matters represent the merits of the present invention.

We claim:

1. A mechanism for positioning the light-receiving end of an optical conductor means at the focal point of a lens comprising a frame means, a lens mounted on said frame means, a holding member mounted on said frame means, said holding member having inner and outer longitudinal ends and an elongated passageway extending between said inner and outer longitudinal ends, said inner end extending into said frame means, an optical conductor means having a longitudinal end portion disposed in said passageway, said optical conductor means having a light-receiving end extending into said frame means and facing said lens such that said light-receiving end receives light rays from said lens, said longitudinal end portion of said optical conductor means having a constant outer diameter along its longitudinal length, positioning means on said optical conductor means having an outer diameter greater than said outer diameter of said longitudinal end portion of said optical conductor means, said outer longitudinal end of said holding member having threaded means thereon, a cap nut mounted on said threaded means, said cap nut having a slit for receiving said optical conductor means such that said cap nut can be slipped over said optical conductor means to a position to engage said threaded means, said cap nut having a transverse wall which is perpendicular to the axis of said elongated passageway and which engages said positioning means on said optical conductor means as said cap nut is threaded on to said threaded means such that said positioning means is disposed between said transverse wall and said outer longitudinal end of said holding member and said cap nut thereby secures said optical conductor means to said holder member with the axial thickness of said positioning means determining the spacing between the light-receiving end of said optical conductor means and said lens.

2. A mechanism according to claim 1, wherein said transverse wall of said cap nut has a central opening for receiving said optical conductor means, said cap nut having an inner and outer wall, said inner wall having thread means thereon, said slit in said transverse wall extending generally radially between said central opening and said outer wall.

3. A mechanism according to claim 1, wherein said positioning means comprises a collar on said optical conductor means.

4. A mechanism according to claim 1, wherein said positioning means comprises a collar on said optical conductor means and spacer means disposed on said optical conductor means juxtaposed to said collar.

5. A mechanism according to claim 4, wherein said spacer means comprises at least one annular spacer element which is received on said optical conductor means.

6. A mechanism according to claim 1, wherein said slit is at least as wide as the outer diameter of said outer optical conductor means.

7. A mechanism according to claim 1, wherein said optical conductor means comprises an optical conductor element and an outer cover about said optical conductor element, said positioning means being disposed on said outer cover.

8. A mechanism according to claim 7, where in said positioning means comprises a collar formed on said outer cover.

9. A mechanism according to claim 8, wherein said positioning means for further comprises at least one spacer element on said outer cover and disposed juxtaposed to said collar.

10. A mechanism according to claim 1, wherein said positioning means has an axial thickness dimensioned to locate said light-receiving end of said optical conductor means at a focal position to receive from said lens the red-colored component of the sun's rays.

11. A mechanism according to claim 1, wherein said positioning means has an axial thickness dimensioned to locate said light-receiving end of said optical conductor means at a focal position to receive from said lens the green-colored component of the sun's rays.

12. A mechanism according to claim 1, wherein said positioning means has an axial thickness dimensioned to locate said light-receiving end of said optical conductor means at a focal position to receive from said lens the blue-colored component of the sun's rays.

* * * * *